United States Patent Office 3,404,185
Patented Oct. 1, 1968

3,404,185
CHROMIUM AMINE COMPLEX CATALYZED OXIDATION OF CYCLIC HYDROCARBONS TO KETONES
Donald C. Thomas and Joe T. Adams, St. Albans, W. Va., assignors to Union Carbide Corporation, a corporation of New York
No Drawing. Filed Apr. 29, 1964, Ser. No. 363,584
6 Claims. (Cl. 260—586)

ABSTRACT OF THE DISCLOSURE

Cyclic hydrocarbons, especially tetrahydronaphthalene and cyclohexane are oxidized to their corresponding ketones with gaseous oxygen in the presence of novel chromium amine catalyst complexes, especially chromium acetate 2-methyl-5-ethylpyridine.

---

This invention relates to an improved synthesis for the production of ketones resulting in increased efficiency and higher yields. In one particular aspect, this invention is concerned with the improved liquid-phase oxidation of tetrahydronaphthalene to the ketone 1-tetrahydronaphthalene with gaseous oxygen in the presence of a novel chromium acetate 2-methyl-5-ethylpyridine catalyst complex.

The liquid-phase oxidation of tetrahydronaphthalene with molecular oxygen has been reported in the literature. Usual products are either mixtures of 1-tetrahydronaphthalone and 1-tetrahydronaphthal, or mixtures of these products with tetrahydronaphthalene hydroperoxide. Lower temperatures (below 100° C.) are known to favor formation of tetrahydronaphthalene hydroperoxide (U.S. Patents Nos. 2,511,957 and 2,568,639). This hydroperoxide decomposes with ease to a nearly equimolar mixture of 1 - tetrahydronaphthalone and 1 - tetrahydronaphthol. Tetrahydronaphthalene hydroperoxide can be converted quantitatively into 1-tetrahydronaphthalene by means of catalytic amounts of ferrous sulfate (J. Org. Chem., vol. 15, 763, 1950). Production of 1-tetrahydronaphthalone from tetrahydronaphthalene by this method requires a two-step route (one step for tetrahydronaphthalene oxidation to tetrahydronaphthalene hydroperoxide, another step for tetrahydronaphthalene hydroperoxide decomposition to 1-tetrahydronaphthalone). This method requires additional equipment, the handling of an unstable intermediate (tetrahydronaphthalene hydroperoxide), and provides low production rates and high by-product formation.

Direct conversion of tetrahydronaphthalene to 1-tetrahydronaphthalone with molecular oxygen by liquid-phase oxidation has been described (German Patent No. 568,338). In this direct conversion, fatty acid salts of cobalt, lead, and manganese were reported effective catalysts at 50–100° C. for synthesis of 1-tetrahydronaphthalone.

Chromium-amine compounds are known, but not as oxidation catalysts. R. F. Weinland, Z. anorg. Chem., vol. 67, 167–182, prepared from pyridine and "diacetate of green hexaacetatotrichromic base" a compound of the following reported structure:

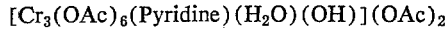
[Cr₃(OAc)₆(Pyridine)(H₂O)(OH)](OAc)₂

However, there is no evidence that the Weinland compound is an oxidation catalyst. There are references to chromium-amine-carbonyl and chromium-amine-halide compounds in the literature, but no references were found to chromium-amine complexes as oxidation catalysts.

In one aspect of this invention, according to the teachings herein, an improved process for the production of 1-tetrahydronaphthalone from tetrahydronophthalene has been discovered. This improved process requires less equipment to carry it out than required heretofore and avoids the handling of the unstable intermediate tetrahydronaphthalene hydroperoxide. It provides higher production rates and lower by-product formation than previous processes for the preparation of 1-tetrahydronaphthalone. In addition, the new and improved process of this invention effects conversion of tetrahydronaphthalene to 1-tetrahydronaphthalone in a single reaction step, rather than the two reaction steps of prior processes. The improved process of this invention gives a tetrahydronaphthalene oxidation product which is almost exclusively the valuable ketone 1-tetrahydronaphthalone, and a major reduction in tetrahydronaphthalene efficiency loss to high-boiling, non-useful tar residues. The practice of the improved process of this invention has provided 1-tetrahydronaphthalone efficiencies above 90 percent. The improved process gives ketone to alcohol ratios of 15:1 to 30:1. The use of the improved process disclosed herein provides a material reduction in both the cost of the process and the cost of the products prepared therefrom.

Accordingly, an object of the present invention is to provide an improved process for the production of ketones. Another object is to provide an improved process for the liquid-phase oxidation of tetrahydronaphthalene to 1-tetrahydronaphthalone with gaseous oxygen in the presence of a novel chromium acetate-2-methyl-5-ethylpyridine catalyst complex. A further object is to provide a novel chromium acetate-2-methyl-5-ethylpyridine catalyst complex. A still further object is to provide almost exclusively, 1-tetrahydronaphthalone from tetrahydronaphthalene through the employment of chromium acetate-2-methyl-5-ethylpyridine catalyst complex. Another further object is to provide improved processes for the liquid-phase oxidation of tetrahydronaphthalene to 1-tetrahydronaphthalone with gaseous oxygen in the presence of other novel chromium salt-amine catalyst complexes, or other chromium salt amine catalyst complexes not heretofore employed in the liquid-phase oxidation of tetrahydronaphthalene to 1-tetrahydronaphthalone. Another further object is to provide an improved process for the liquid-phase oxidation synthesis of other useful ketones using gaseous oxygen on the ketone-precursor in the presence of other novel chromium-amine catalyst complexes in addition to chromium acetate 2-methyl-5-ethylpyridine catalyst complex. A still further object is to provide other novel oxidation catalyst complexes which contain other transition metals, and members from Groups VI, V, and VII of the Periodic Table of Elements, as well as other amines. These and other objects of this invention, as well as the advantages derived therefrom, will become apparent to those skilled in the art from the ensuing description of the invention.

In a particular aspect, the improved process of the present invention resides in the concept of a novel chromium acetate-2-methyl-5-ethylpyridine catalyst complex, its preparation, and its use in the liquid-phase oxidation of tetrahydronaphthalene to 1-tetrahydronaphthalone with gaseous oxygen.

The most preferred catalyst in the process of this invention is the chromium acetate 2-methyl-5-ethylpyridine catalyst complex. This complex is prepared from the salt chromium acetate and the vehicle 2-methyl-5-ethylpyridine. The exact structure of this complex is at present unknown. It can be readily looked upon as a catalyst complex of chromium acetate in 2-methyl-5-ethylpyridine, as vehicle. The catalyst complex can be prepared simply by bringing the chromium acetate and 2-methyl-5-ethylpyridine vehicle together. Mixing the two together will further formation of the catalyst complex. Broadly, it can be referred to as a catalyst complex of a chromium salt in an amine vehicle.

The novel chromium acetate-2-methyl-5-ethylpyridine catalyst complex disclosed herein provides at least two very valuable features: (1) an almost exclusively 1-tetrahydronaphthalone product; and (2) higher chemical efficiency to 1-tetrahydronaphthalone plus tetrahydronaphthal by reducing conversion to high-boiling, non-useful tars. The catalyst complex of this invention provides 1-tetrahydronaphthalone efficiencies above 90 percent and gives ketone to alcohol ratios of 15:1 to 30:1.

Other chromium salts both chromous and chromic may be employed as a satisfactory source of chromium to provide other chromium salts which can be placed in the vehicle 2-methyl-5-ethyl-pyridines. For example, chromous chloride, chromous bromide chromous iodide, chromous acetylacetonate, chromous stearate, chromous nitrate, chromic chloride, chromic bromide, chromic iodide, chromic acetylacetonate, chromic stearate, chromic nitrate, and the like. Other chromium salts in 2-methyl-5-ethylpyridine can give rise to chromium salt-2-methyl-5-ethylyridine catalyst complexes, like and in addition to, chromium acetate-2-methyl-5-ethylpyridine. For example, chromium chloride-2-methyl-5-ethylpyridine complexes, chromium bromide-2-methyl-5-ethylpyridine complexes, chromium acetylacetonate-2-methyl-5-ethylpyridine complexes, chromium stearate -2-methyl-5-ethylpyridine complexes, chromium nitrate-2-methyl-5-ethylpyridine complexes, and the like.

The improved process of this invention employs gaseous oxygen as either molecular oxygen, air, or an oxygen-containing gas as the oxidant. Of these oxidants, molecular oxygen is most preferred, with air preferred and an oxygen-containing gas deemed operative. The mole ratios of reactants, gaseous oxygen to tetraphdronaphthalene is most preferably 0.4 to 0.6, preferably 0.2 to 0.6, and operably 0.05 to 1.5. The gaseous oxygen to tetrahydronaphthalene ratio should be high enough to enable the desired extent of reaction (preferably below 45 percent tetrahydronaphthalene conversion), but should not be sufficiently high to create an unnecessary safety hazard from excessive oxygen breakthrough. The temperature of the process can range from about 50 to about 250° C., with from about 125 to about 1750 C. preferred, and from about 130 to about 165° C. most preferred. The total pressure on the system is of minor importance and not critical and need only be enough to maintain the liquid-phase. The total pressure need only be sufficient to maintain the reaction mixture in the liquid phase. Higher pressures minimize gaseous hydrocarbon content but result in an increase in the cost of the reaction equipment. The preferred partial pressure of oxygen at the point of admixture with the hydrocarbon is from about 10 to about 50 p.s.i.a., with about 14 p.s.i.a most preferred. Wider limits of operable pressure for the partial oxygen are possible. However, as the partial pressure is lowered the oxygen concentration is reduced and conversion diminishes. An increase in the partial pressure becomes hazardous as the concentration of oxygen approaches that of explosive mixtures of oxygen and hydrocarbon.

The reaction time, liquid-phase, is not critical and varies from about 0.1 to about 1.5 hours, depending upon the temperature. A reaction time of from about 0.2 to about 0.7 hour is preferred, with about 0.5 hour most preferred. The contact time, gaseous oxygen, with liquid can very from about 0.1 to about 10 seconds depending upon the temperature and mixing effect. A contact time of from about 0.5 to about 5 seconds is preferred, with a contact time of about 1 second most preferred. No solvents are required in addition to the reactants and catalysts. The concentration of reactant tetrahydronaphthalene can be the highest convenient concentration of tetrahydronaphthalene in liquid phase and is not deemed critical. The concentration of tetrahydronaphthalene need only be high enough to enable the desired extent of reaction (preferably below 45 percent tetrahydronaphthalene conversion). The concentration of gaseous oxygen can be the highest convenient concentration of oxygen in vapor-phase and is not deemed critical. The concentration of oxygen need only be high enough to enable the desired extent of reaction (preferably below 45 percent tetrahydronaphthalene conversion).

The catalyst concentration in the process of this invention need only be a catalytic amount. The catalyst concentration can vary from about 0.1 to about 250 p.p.m. (chromium), with from about 5 to about 70 p.p.m. (chromium) preferred, and with about 25 p.p.m. (chromium) most preferred. The process of this invention requires no catalyst support, it is homogeneous. The reaction phase (i.e., liquid, vapor) is most preferable gas-liquid (2 phase), with a gas phase alone deemed operative. The reaction type (i.e., batch, continuous) is most preferably continuous, with continuous, or batched or mixed operative. The reactor type is not critical and any reactor giving good gas-liquid contact is operable. A glass-lined or nonferrous reactor is preferred. Special limits on impurities in the process of the invention are that in the most preferred form the process is carried out in an iron-free system. Presence of iron appears to effect ketone selectivity in the reactor oxidation zone. The effect of iron perhaps can be overcome by equipment passivation or addition of additives to oxidizer feeds.

As for other factors affecting the process of this invention, again, it is generally best to limit tetrahydronaphthalene conversion to maintain highest productivity of 1-tetrahydronaphthalone. Higher conversions can reduce efficiency and productivity. It is also generally best to limit oxygen content in reactor off gas to below about 7 volume percent for safety (explosion hazard from ignitable mixture).

The following examples illustrate the improvement of this invention.

EXAMPLE I

Using a glass reactor 1¼″ ID x 30″ high, jacketed for temperature control with circulating mineral oil and fitted with a sparger at base of reactor for entry of gaseous molecular oxygen. Charged 240 ml. tetrahydronaphthalene of 98.8 weight percent purity, 0.10 gm. chromic acetate, and 2.4 ml. 2-methyl-5-ethylpyridine. Oxygen flow was started, and reaction temperature raised to 125° C. At the end of 30 minutes, the liquid reaction product was sampled and analyzed 25.8 wt. percent 1-tetrahydronaphthalone, 1.3% 1-tetrahydronaphthol, and 0.8% residues. Total tetrahydronaphthalene conversion was 29.2%, efficiency to 1-tetrahydronaphthalone plus 1-tetrahydronaphthol totaled 96.4% and ratio of 1-tetrahydronaphthalone to 1-tetrahydronaphthol was 19.8.

EXAMPLE II

Operation under similar conditions as in Example I with chromium acetate alone (without 2-methyl-5-ethylpyridine) in tetrahydronaphthalene gave only slightly higher conversion (36.8%), but lower useful efficiency (83.3%), and a ratio of 1-tetrahyldronaphthalone to 1-tetrahydronaphthol in the product of only 1.7.

EXAMPLE III

Operation under similar conditions as in Example I with 2-methyl-5-ethylpyridine alone (without chromium acetate) in tetrahydronaphthalene gave no substantial catalytic effect.

EXAMPLE IV

Operation under similar conditions as in Example I without chromium acetate and 2-methyl-5-ethylpyridine in tetrahydronaphthalene gave only 9% total tetrahydronaphthalene conversion, efficiency to 1-tetrahydronaphthalone was only 10%, and the principal product was tetrahydronaphthalene hydroperoxide.

EXAMPLE V

Operation under similar conditions as in Example I with cobalt naphthenate alone (without 2-methyl-5-ethylpyridine) gave the same conversion as Example I in 20 minutes, but efficiency to 1-tetrahydronaphthalone and 1-tetrahydronaphthol totaled only 78–80% with 20–30 minute reaction times, and the 1-tetrahydronaphthalone to 1-tetrahydronaphthol ratio was only 2.2. This ratio is affected by extent of conversion to a modest content, at 40% total tetrahydronaphthalene conversion the ketone to alcohol ratio is about 3.1 and at 15.9% conversion the ratio was only 1.8.

Table I further illustrates the improvement of this invention.

The following data was obtained in a 300 ml. jacketed glass reactor with oxygen under atmospheric pressure. Batch liquid, continuous gas flow, using feed tetrahydronaphthalene of 98.7 percent purity. Used chromium acetate in 2-methyl-5-ethylpyridine (MEP) as catalyst.

TABLE I.—TETRAHYDRONAPHTHALENE OXIDATION PERFORMANCE OF CHROMIUM ACETATE-2-METHYL-5-ETHYLPYRIDINE CATALYST

| | | | |
|---|---|---|---|
| Chromium, p.p.m. Cr [1] | 250 | 250 | 85 |
| MEP, vol. percent of tetrahydronaphthalene | 1.0 | 1.0 | 1.0 |
| Reaction temperature, °C | 125 | 125 | 125 |
| Time, hours | 0.5 | 0.5 | 0.5 |
| Product analysis, wt. percent: | | | |
| 1-tetrahydronaphthalone | 26.0 | 25.0 | 25.8 |
| 1-tetrahydronaphthol | 1.9 | 1.4 | 1.3 |
| THP | 0.1 | 1.0 | 1.1 |
| Residues | [2] 1.1, 2.0 | 1.5 | [2] 0.8, 1.50 |
| MEP [3] | 1.0 | | 1.0 |
| Conversion, percent | 27.5 | 28.9 | 29.2 |
| THP efficiency, percent | 0.3 | 3.0 | 3.7 |
| Total useful efficiency, percent | 95.1 | 93.5 | 96.4 |
| Productivity, net lb./hr./cu. ft. reactor | 34.7 | 36.4 | 36.9 |
| Product tetrahydronaphthalone/tetrahydronaphthol ratio, wt. | 13.7 | 17.8 | 19.8 |

[1] Only small portions of the chromium compound (estimated to be about 10 wt. percent) actually dissolved or dispersed in the reaction mixture.
[2] Residues using flash evaporation method, 137° C., kettle temperature at 25 mm. of Hg pressure.
[3] MEP analysis was by gas chromatograph. The MEP peak was verified by injection of additional MEP. THP-tetrahydronaphthalene hydroperoxide.

Although this invention has been illustrated with reference to one particular aspect thereof, that is, the aforementioned oxidation of tetrahydronaphthalene to 1-tetrahydronaphthalone, the invention is not to be limited thereto. The improved process disclosed herein for the oxidation of tetrahydronaphthalene to 1-tetrahydronaphthalone is deemed operable to the oxidation synthesis of other ketones from ketone precursors. The improved process disclosed herein may be extended to other ketone synthesis such as cyclohexanone from cyclohexane; methoxytetralones from methoxytetralins; ketones from naphthenes and alkyl-substituted naphthenes; ketones from partially-saturated aromatics; and others. The process may be applied to hydrocarbons in general and partially saturated aromatic and naphtenes in particular. Hydrocarbons as ketone precursors are deemed operative, partially saturated aromatics and naphthenes are preferred, and tetrahydronaphthalene is most preferred.

Moreover, although this invention has been illustrated using chromimum acetate-2-methyl-5-ethylpyridine catalyst complex, other metals and amines may also be operable in forming suitable catalyst complexes. Other metals in addition to chromium may include those in Groups VI, V, and VII of the Periodic Table of Elements, for example vanadium. Other suitable amines may include those containing any active hydrogen such as aliphatic and aromatic amines, for example, pyridine, n-butylamine, α-picoline cyclohexylamine, quinoline, and the like, as well as mixtures thereof.

Particularly suitable amines are those alkyl-substituted pyridines. especially the lower alkyl-substituted pyridines such as for example, 2-ethyl-5-methylpyridine, 2-propyl-5-methylpyridine, 2-isopropyl-5-methylpyridine, 2-methyl-5-propylpyridine, 2-methyl-5-isopropylpyridine, 2-methyl-5-tert.butylpyridine, and the like. The lower alkyl substituent on the pyridine ring can contain from 1 to 8 carbon atoms. The pyridine ring can be substituted with one, two or more alkyl substituents, with two preferred, the total alkyl content on the ring not to exceed 8 carbon atoms.

In addition, although this invention is primarily directed toward chromium acetate-2-methyl-5-ethylpyridine as catalyst complex, that is, a catalyst complex or mixture consisting essentially of chromium acetate in 2-methyl-5-ethylpyridine, it does not avoid this catalyst complex or mixture containing other amines incorporated therein and forming and part thereof. For example, a catalyst complex composed of chromium acetate-2-methyl-5-ethylpyridine-alpha-picoline mixtures.

Moreover, the chromium acetate-2-methyl-5-ethylpyridine, in addition to consisting essentially of chromium acetate in 2-methyl-5-ethylpyridine as vehicle, for example, chromium acetate in 2-methyl-5-ethylpyridine (1.0 percent chromium), can also be an aqueous chromium acetate solution in 2-methyl-5-ethylpyridine, for example, aqueous chromium acetate solution in 2-methyl-5-ethylpyridine (13 percent chromium acetate). In addition, various combinations of the above are operative as oxidation catalysts. For example, aqueous chromium acetate solutions in combination with 2-methyl-5-ethylpyridine-alpha-picoline mixtures, as catalyst for the liquid-phase oxidation of tetrahydronaphthalene to 1-tetrahydronaphthalone.

Table II presents data from the liquid-phase oxidation of tetrahydronaphthalene to 1-tetrahydronaphthalone using chromium acetate in 2-methyl-5-ethylpyridine; chromium acetate in 2-methy-5-ethylpyridine and alpha-picoline; aqueous chromium acetate in 2-methyl-5-ethylpyridine; aqueous chromium acetate in 2-methyl-5-ethylpyridine and alpha-picoline; and aqueous chromium acetate in alpha-picoline.

TABLE II.—CHROMIUM ACETATE-AMINE CATALYZED OXIDATION OF TETRAHYDRONAPHTHALENE
[Glass reactor, 125° C., 1 atm., O₂]

| | | | | Percent efficiency | | | |
|---|---|---|---|---|---|---|---|
| Ex.[1] | Percent amine [4] | Conversion | Tone/tol [3] | 1-tetrahydronaphthalene | 1-tetrahydronaphthol | Peroxide | Residue |
| 6 | 2.0% MEP [2] | 24.5 | 11.2 | 87.3 | 7.8 | 1.2 | 3.8 |
| 7 | 1.8% MEP, 0.2% α-picoline | 24.2 | 13.4 | 88.5 | 6.6 | 1.3 | 3.7 |
| 8 | 1.4% MEP, 0.6% α-picoline | 24.8 | 11.5 | 88.4 | 7.7 | 1.3 | 2.8 |
| 9 | 1.0% MEP, 1.0% α-picoline | 24.4 | 9.5 | 85.2 | 9.0 | 1.6 | 4.2 |
| 10 | 2.0% MEP | 22.4 | 24.7 | 88.9 | 3.6 | 1.9 | 5.7 |
| 11 | 1.0% MEP, 1.0% α-picoline | 24.5 | 20.8 | 85.3 | 4.1 | 2.4 | 8.2 |
| 12 | 1.4% MEP, 0.6% α-picoline | 23.6 | 21.6 | 90.7 | 4.2 | 2.4 | 2.7 |
| 13 | 2.0% α-picoline | 25.9 | 17.7 | 88.1 | 5.0 | 4.1 | 2.9 |

[1] 6 through 9 with chromium acetate in MEP[3] (1.0% chromium) solution. 10 thru 13 with 13% aqueous chromium acetate solution.
[2] 2-methyl-5-ethylpyridine.
[3] 1-tetrahydronaphthalene to 1-tetrahydronaphthol ratios.
[4] Contains 100 p.p.m. chromium.

In Table II a solution of chromium acetate in 2-methyl-5-ethylpyridine (1.0 percent chromium) was diluted with alpha-picoline and 2-methyl-5-ethylpyridine so as to provide catalyst mixtures contains 0%, 10%, 30%, and 50% of alpha-picoline and 100 p.p.m. chromium. A similar series of catalyst mixtures containing 30%, 50%, and 100% of alpha-picoline also were prepared using aqueous chromium acetate solution (13.0 percent chromium acetate).

Table III presents data on the liquid phase oxidation of tetrahydronaphthalene to 1-tetrahydronaphthalone using an aqueous chromium catalyst in 2-methyl-5-ethylpyridine.

TABLE III.—TETRAHYDRONAPHTHALENE LIQUID-OXIDATION WITH AN AQUEOUS CHROMIUM CATALYST [1]

| Ex. | Method equipment | Temperature pressure | Oxidant | Catalyst | Percent conversion | Percent efficiency ||||
|---|---|---|---|---|---|---|---|---|---|
| | | | | | | 1-tetrahydronaphthalone | 1-tetrahydronaphthol | Peroxide | Residue |
| 14 | Batch glass | 125° C., 1 atm | Moleclar oxygen | 100 p.p.m. Cr,[2] 2% MEP. | 22 | 94.0 | 3.2 | nil | 2.8 |
| 15 | do | 125° C., 1 atm | do | 100 p.p.m. Cr,[3] 2% MEP. | 21 | 87.2 | 4.3 | 3.3 | 5.2 |
| 16 | Continuous steel | 140° C., 140 p.s.i.g. | Air | 100 p.p.m. Cr, 2% MEP. | 12 | 80.3 | 8.6 | 6.0 | 5.1 |
| 17 | do | 140° C., 140 p.s.i.g. | Air | 100 p.p.m. Cr, 2% MEP. | [4] 17 | 69.3 | 11.0 | 9.4 | 10.3 |

[1] A 13% solution of chromium acetate.
[2] MEP (2-methyl-5-ethylpyridine) and chromium solution premixed and added to tetrahydronaphthalene.
[3] Chromium solution added to premixed MEP and tetrahydronaphthalene.
[4] Tetrahydronaphthalene feed rate one-half of the rate of Example 16.

The 1-tetrahydranaphthalone prepared via the process of this invention is used in the synthesis of the commercially important insecticide 1-naphthyl N-methyl carbamate.

In the preparation of 1-naphthyl N-methyl carbamate the tetrahydronaphthalene oxidation step has been the least efficient step. The improved process of this invention is a decided improvement over prior processes to 1-naphthyl N-methyl carbamate.

The tetrahydronaphthalene used as the 1-tetrahydronaphthalone precursor in the process of this invention can be obtained from naphthalene by hydrogenation according to U.S. Patent 2,929,854. The 1-tetrahydronaphthalone is then used to prepare 1-naphthol by dehydrogenation according to U.S. Patents Nos. 2,588,359 and 2,640,084. The 1-naphthol is then treated with phosgene to give 1-naphthyl chloroformate. The 1-naphthyl chloroformate is then treated with methylamine to provide the commercially important insecticide 1-naphthyl N-methyl carbamate.

What is claimed is:
1. An improved process for the liquid-phase oxidation of a cyclic hydrocarbon of the group consisting of cyclohexane, tetrahydronapthalene, and methoxytetrahydronaphthalene to the corresponding ketone which process comprises contacting the said cyclic hydrocarbon with gaseous oxygen in the presence of chromium acetate 2-methyl-5-ethylpyridine complex or chromium acetate 2-methyl-5-ethylpyridine-alpha-picoline catalyst complex at a temperature of from 50 to 250° C.

2. An improved process for the liquid-phase preparation of 1-tetrahydronaphthalone from tetrahydronaphthalene which comprises oxidizing tetrahydronaphthalene to 1-tetrahydronaphthalone with gaseous oxygen in the presence of chromium acetate-2-methyl-5-ethylpyridine catalyst complex at a temperature of from 50 to 250° C.

3. An improved process for the liquid-phase preparation of cycylohexanone which comprises oxidizing cyclohexane to cyclohexanone with gaseous oxygen in the presence of chromium acetate-2-methyl-5-ethylpyridine catalyst complex at a temperature of from 50 to 250 C.

4. An improved process for the liquid-phase preparation of 1-tetrahydronaphthalone from tetraphydronaphthalene which comprises oxidizing tetrahydronaphthalene to 1-tetrahydronaphthalone with gaseous oxygen in the presence of aqueous chromium acetate-2-methyl-5-ethylpyridine catalyst complex at a temperature from 50 to 250° C.

5. An improved process for the liquid-phase preparation of 1-tetrahydronaphthalone from tetraphydronaphthalene which comprises oxidizing tetrahydronaphthalene to 1-tetraphydronaphthalone with gaseous oxygen in the presence of aqueous chromium acetate-2-methyl-5-ethylof from 50 to 250° C.

6. An improved process for the liquid-phase preparation of 1-tetrahydronaphthalone from tetraphydronaphthalene which comprises oxidizing tetrahydonaphthalene to 1-tetrahydronaphthalone with gaseous oxygen in the presence of chromium acetate-2-methyl-5-ethylpyridine-alpha-picoline catalyst complex at a temperature of from 50 to 250° C.

References Cited
UNITED STATES PATENTS

| | | | |
|---|---|---|---|
| 2,920,087 | 1/1960 | Hay | 760—586 |
| 1,789,924 | 1/1931 | Binapfl et al. | 260—590 |
| 2,640,084 | 5/1953 | Chitwood et al. | 260—621 |
| 3,040,101 | 6/1962 | Luzader | 252—426 |
| 3,164,611 | 1/1965 | Sareta | 260—586 |

FOREIGN PATENTS 824,046  11/1959  Great Britain.

LEON ZITVER, *Primary Examiner.*

M. JACOB, *Assistant Examiner.*